US007931995B2

(12) United States Patent
Bahar et al.

(10) Patent No.: US 7,931,995 B2
(45) Date of Patent: Apr. 26, 2011

(54) SOLID ELECTROLYTE COMPOSITE FOR ELECTROCHEMICAL REACTION APPARATUS

(75) Inventors: Bamdad Bahar, Elkton, MD (US); Greg Rusch, Newark, DE (US); Jeffrey Kolde, Baltimore, MD (US); Hiroshi Kato, Okayama (JP)

(73) Assignee: Gore Enterprise Holdings, Inc., Newark, DE (US)

( * ) Notice: Subject to any disclaimer, the term of this patent is extended or adjusted under 35 U.S.C. 154(b) by 1297 days.

(21) Appl. No.: 10/657,096

(22) Filed: Sep. 9, 2003

(65) Prior Publication Data

US 2004/0045814 A1    Mar. 11, 2004

Related U.S. Application Data

(60) Continuation of application No. 09/828,866, filed on Apr. 10, 2001, now Pat. No. 6,635,384, which is a continuation of application No. 09/036,509, filed on Mar. 6, 1998, now abandoned, which is a division of application No. 08/928,207, filed on Sep. 12, 1997, now Pat. No. 6,242,135.

(51) Int. Cl.
  *H01M 8/10*    (2006.01)
  *H01M 2/16*    (2006.01)
  *H01M 6/18*    (2006.01)
(52) U.S. Cl. ........ 429/465; 429/304; 429/300; 429/316; 429/249; 429/251; 429/252
(58) Field of Classification Search .................. 429/304, 429/252, 300, 30, 33, 316, 249, 251
See application file for complete search history.

(56) References Cited

U.S. PATENT DOCUMENTS

| 2,393,967 A | 2/1946 | Brubaker ........................ 260/80 |
| 2,559,752 A | 7/1951 | Berry ........................... 260/29.6 |
| 2,593,583 A | 4/1952 | Lontz ........................... 260/92.1 |
| 2,681,319 A | 6/1954 | Bodamer |
| 2,827,426 A | 3/1958 | Bodamer |
| 2,951,818 A | 9/1960 | Haagen |
| 2,965,697 A | 12/1960 | Duddy |

(Continued)

FOREIGN PATENT DOCUMENTS

AU    88-17506    4/1989

(Continued)

OTHER PUBLICATIONS

Penner et al., "Ion transporting Composite Membranes," Journal of the Electrochemical Society, vol. 132, No. 2, Feb. 1985, pp. 514-514.
Taylor et al., "The Effect of Support Morphology on Composite Membrane Performance," Electrochemical Society Meeting, San Diego, Oct. 19-24, 1986.

(Continued)

*Primary Examiner* — Dah-Wei Yuan
*Assistant Examiner* — Angela J. Martin
(74) *Attorney, Agent, or Firm* — Locke Lord Bissell & Liddell LLP

(57) ABSTRACT

A solid polymer electrolyte composite for an electrochemical reaction apparatus that possesses satisfactory ion conduction properties and has excellent mechanical strength and heat resistance, is provided. the solid polymer electrolyte composite is characterized in that a solid polymer electrolyte is contained in the continuous pores of an expanded porous polytetrafluoroethylene sheet which has continuous pores and in which the inner surfaces defining the pores are covered with a functional material such as a metal oxide. An electrochemical reaction apparatus containing an electrolyte, wherein said electrochemical reaction apparatus is characterized in that the aforementioned solid polymer electrolyte composite is used as this electrolyte is also provided.

18 Claims, 2 Drawing Sheets

U.S. PATENT DOCUMENTS

| | | | |
|---|---|---|---|
| 3,041,317 A | 6/1962 | Gibbs et al. ................. 260/79.3 |
| 3,214,501 A | 10/1965 | Strauss ........................... 264/49 |
| 3,497,394 A * | 2/1970 | Berger ......................... 429/300 |
| 3,640,829 A | 2/1972 | Elton .............................. 161/159 |
| 3,647,086 A | 3/1972 | Mizutani et al. |
| 3,679,540 A | 7/1972 | Zimmerman et al. ........ 161/159 |
| 3,692,569 A | 9/1972 | Grot |
| 3,870,593 A | 3/1975 | Elton et al. .................... 161/159 |
| 3,953,566 A | 4/1976 | Gore ............................. 264/288 |
| 3,962,153 A | 6/1976 | Gore ........................... 260/2.5 R |
| 4,012,303 A | 3/1977 | D'Agostino et al. |
| 4,065,534 A | 12/1977 | Rechlicz et al. |
| 4,096,227 A | 6/1978 | Gore ............................. 264/210 |
| 4,100,238 A | 7/1978 | Shinomura ..................... 264/49 |
| 4,107,005 A | 8/1978 | D'Agostino et al. |
| 4,110,392 A | 8/1978 | Yamazaki ..................... 264/127 |
| 4,178,218 A | 12/1979 | Seko .............................. 204/98 |
| 4,186,076 A | 1/1980 | De Nora et al. |
| 4,187,390 A | 2/1980 | Gore ......................... 174/102 R |
| 4,197,148 A | 4/1980 | Shinomura ..................... 156/79 |
| 4,207,163 A | 6/1980 | Kadija |
| 4,207,164 A | 6/1980 | Kadija |
| 4,210,510 A | 7/1980 | Grimes |
| 4,218,542 A | 8/1980 | Ukihashi et al. |
| 4,224,121 A | 9/1980 | Dempsey et al. |
| 4,255,523 A | 3/1981 | Ukihashi et al. ................ 521/27 |
| 4,262,041 A | 4/1981 | Eguchi et al. |
| 4,267,364 A | 5/1981 | Grot et al. ...................... 560/183 |
| 4,313,832 A | 2/1982 | Shimizu et al. |
| 4,341,615 A | 7/1982 | Bachot et al. |
| 4,429,000 A | 1/1984 | Naka et al. ..................... 428/265 |
| 4,437,951 A | 3/1984 | Bissot et al. .................... 204/98 |
| 4,453,991 A | 6/1984 | Grot |
| 4,469,744 A | 9/1984 | Grot |
| 4,515,906 A | 5/1985 | Friesen et al. |
| 4,518,650 A | 5/1985 | Grot et al. |
| 4,539,256 A | 9/1985 | Shipman .................... 428/315.5 |
| 4,544,458 A | 10/1985 | Grot et al. ........................ 204/98 |
| 4,568,441 A | 2/1986 | Covitch et al. ................. 204/283 |
| 4,604,170 A | 8/1986 | Miyaka et al. |
| 4,629,563 A | 12/1986 | Wrasidla |
| 4,664,801 A | 5/1987 | Thomas |
| 4,698,243 A | 10/1987 | Carl et al. |
| 4,720,400 A | 1/1988 | Manniso ....................... 427/243 |
| 4,724,157 A | 2/1988 | Toda et al. |
| 4,726,989 A | 2/1988 | Mrozinski .................. 428/315.5 |
| 4,731,263 A | 3/1988 | Martin et al. |
| 4,774,039 A | 9/1988 | Wrasidlo |
| 4,781,767 A | 11/1988 | Toda et al. |
| 4,804,592 A | 2/1989 | Vanderborgh et al. |
| 4,835,007 A | 5/1989 | Toda et al. |
| 4,849,311 A | 7/1989 | Itoh et al. ...................... 429/192 |
| 4,862,730 A | 9/1989 | Crosby |
| 4,863,604 A | 9/1989 | Lo et al. |
| 4,865,925 A | 9/1989 | Ludwig et al. |
| 4,865,930 A | 9/1989 | Kindler et al. |
| 4,875,908 A | 10/1989 | Kikukawa et al. |
| 4,895,775 A | 1/1990 | Kato et al. |
| 4,902,308 A | 2/1990 | Mallouk et al. |
| 4,931,168 A | 6/1990 | Watanabe et al. |
| 4,954,388 A | 9/1990 | Mallouk et al. |
| 4,985,296 A | 1/1991 | Mortimer, Jr. |
| 4,990,228 A | 2/1991 | Perusich et al. |
| 4,997,567 A | 3/1991 | Messalem et al. |
| 5,066,403 A | 11/1991 | Dutta et al. |
| 5,075,006 A | 12/1991 | Schucker |
| 5,082,472 A | 1/1992 | Mallouk et al. .................... 55/16 |
| 5,082,475 A | 1/1992 | Bentz |
| 5,087,767 A | 2/1992 | Okamoto et al. |
| 5,094,895 A | 3/1992 | Branca et al. |
| 5,124,018 A | 6/1992 | Furuya et al. |
| 5,147,722 A * | 9/1992 | Koslow ......................... 428/402 |
| 5,154,827 A | 10/1992 | Ashelin et al. |
| 5,183,545 A | 2/1993 | Branca et al. |
| 5,186,877 A | 2/1993 | Watanabe |
| 5,188,890 A | 2/1993 | Ohashi et al. |
| 5,190,813 A | 3/1993 | Oshahi et al. |
| 5,209,850 A | 5/1993 | Abayasekara et al. |
| 5,211,827 A | 5/1993 | Peck |
| 5,228,994 A | 7/1993 | Tkacik et al. |
| 5,234,777 A | 8/1993 | Wilson |
| 5,256,503 A | 10/1993 | Cook et al. |
| 5,266,421 A | 11/1993 | Townsend et al. |
| 5,275,725 A | 1/1994 | Ishii et al. |
| 5,288,384 A | 2/1994 | Banerjee |
| 5,322,602 A | 6/1994 | Razaq ...................... 204/153.22 |
| 5,336,384 A | 8/1994 | Tsou et al. |
| 5,336,573 A * | 8/1994 | Zuckerbrod et al. ........... 429/252 |
| 5,338,412 A | 8/1994 | Burk et al. |
| 5,356,663 A | 10/1994 | Perusich et al. |
| 5,415,888 A | 5/1995 | Banerjee et al. |
| 5,422,411 A | 6/1995 | Wei et al. ....................... 526/243 |
| 5,425,865 A | 6/1995 | Singleton et al. |
| 5,438,082 A | 8/1995 | Helmer-Metzman et al. |
| 5,447,636 A | 9/1995 | Banerjee |
| 5,453,333 A | 9/1995 | Takauchi |
| 5,468,574 A | 11/1995 | Ehrenberg et al. |
| 5,472,799 A | 12/1995 | Watanabe ........................ 429/30 |
| 5,521,023 A * | 5/1996 | Kejha et al. .................... 429/142 |
| 5,523,181 A * | 6/1996 | Stonehart et al. .............. 429/314 |
| 5,531,899 A | 7/1996 | Yen et al. ....................... 210/638 |
| 5,545,475 A | 8/1996 | Korleski |
| 5,547,551 A | 8/1996 | Bahar et al. .................... 204/296 |
| 5,547,911 A | 8/1996 | Grot .............................. 502/101 |
| 5,597,659 A | 1/1997 | Morigaki |
| 5,599,614 A * | 2/1997 | Bahar et al. .................... 442/171 |
| 5,599,638 A | 2/1997 | Surampudi et al. |
| 5,602,669 A | 2/1997 | Chaki ............................ 359/181 |
| 5,635,041 A | 6/1997 | Bahar et al. |
| 5,672,438 A | 9/1997 | Banerjee et al. |
| 5,766,787 A | 6/1998 | Watanabe et al. |
| 5,795,668 A | 8/1998 | Banerjee |
| 5,874,182 A | 2/1999 | Wilkinson et al. |
| 5,882,723 A | 3/1999 | Tsou |
| 6,054,230 A | 4/2000 | Kato |
| 6,059,943 A * | 5/2000 | Murphy et al. ................ 204/296 |
| 6,130,175 A * | 10/2000 | Rusch et al. ..................... 442/77 |
| 6,242,135 B1 | 6/2001 | Mushiake |
| 6,254,978 B1 | 7/2001 | Bahar et al. |
| RE37,307 E | 8/2001 | Bahar et al. |
| RE37,656 E | 4/2002 | Bahar et al. |
| RE37,701 E | 5/2002 | Bahar et al. |
| 2003/0113604 A1 | 6/2003 | Baher et al. |

FOREIGN PATENT DOCUMENTS

| | | |
|---|---|---|
| EP | 0 326 360 A2 | 8/1989 |
| EP | 0 326 632 A1 | 8/1989 |
| EP | 0 581 510 | 7/1992 |
| EP | 0 503 147 A1 | 9/1992 |
| EP | 0503147 * | 9/1992 |
| EP | 0503147 A1 * | 9/1992 |
| EP | 0 550 262 A1 | 7/1993 |
| EP | 0 572 810 A1 | 12/1993 |
| EP | 0 574 791 A2 | 12/1993 |
| EP | 0 579 852 | 1/1994 |
| EP | 0 594 007 A1 | 4/1994 |
| EP | 651 455 | 5/1995 |
| EP | 0 661 336 A1 | 7/1995 |
| EP | 0 718 903 A1 | 6/1996 |
| FR | 2 295 982 | 7/1976 |
| GB | 1 339 207 | 11/1973 |
| GB | 2 009 788 | 6/1979 |
| GB | 2009788 * | 6/1979 |
| GB | 2 026 381 | 2/1980 |
| GB | 2 052 382 | 1/1981 |
| GB | 2 091 166 | 7/1982 |
| JP | 49-146570 | 12/1974 |
| JP | 51-71888 | 6/1976 |
| JP | 57-134586 | 8/1982 |
| JP | 61-246394 | 1/1986 |
| JP | 61-276987 | 12/1986 |
| JP | 62-131038 | 6/1987 |
| JP | 62-179168 | 8/1987 |
| JP | 62-280230 | 12/1987 |
| JP | 62-280231 | 12/1987 |

| | | |
|---|---|---|
| JP | 60 030542 | 2/1988 |
| JP | 63-99246 | 4/1988 |
| JP | 64-22932 | 1/1989 |
| JP | 11 58051 | 6/1989 |
| JP | 01-186752 | 7/1989 |
| JP | 2-230662 | 9/1990 |
| JP | 2-291607 | 12/1990 |
| JP | H6-29032 | 2/1994 |
| JP | 8-265533 | 9/1996 |
| WO | 89/06055 | 6/1989 |
| WO | 90/13593 | 11/1990 |
| WO | 91/14021 | 9/1991 |
| WO | WO 91/14021 * | 9/1991 |
| WO | 95/16730 | 6/1995 |
| WO | 96/28242 | 9/1996 |
| WO | 96/29752 | 9/1996 |
| WO | 97/25369 | 7/1997 |

OTHER PUBLICATIONS

Asawa, "Material Properties of Cation Exchange Membranes for Chloralkali Electrolysis, Water Electrolysis and Fuel Cells," Journal of Applied Electrochemisty, vol. 19, No. 4, 1989, pp. 566-570.

Liu et al., "Ion Transporting Composite Membranes," Journal of Electrochemical Society, vol. 137, No. 2, Feb. 1990, pp. 510-515.

Verbrugge et al., "Composite Membranes for Fuel-Cell Applications," AICHE Journal, vol. 38, No. 1, Jan. 1992, pp. 92-100.

Glad et al., "Synthesis of Reactive Composite Membranes from Celgard 2400 and Methacrlate Monomers," Journal of Membrane Science, vol. 67, 1992, pp. 289-293.

Kolde et al., "Advanced Composite Polymer Electrolyte Fuel Cell Membranes," Electrochemical Society Proceedings, vol. 95-23, 1995, pp. 193-201.

* cited by examiner

SOLID ELECTROLYTE COMPOSITE FOR ELECTROCHEMICAL REACTION APPARATUS

This application is a continuation of Ser. No. 09/828,866, filed Apr. 10, 2001, now U.S. Pat. No. 6,635,384 which is a continuation of Ser. No. 09/036,509, filed Mar. 6, 1998, now abandoned, which is a divisional of Ser. No. 08/928,207, filed Sep. 12, 1997, now U.S. Pat. No. 6,242,135, issued Jun. 5, 2001.

FIELD OF THE INVENTION

This invention relates to composite membranes for use in electrochemical apparatus and processes. More particularly, the invention relates to microporous membranes that contain electrolytes in the pores.

BACKGROUND OF THE INVENTION

Solid polymer electrolytes have recently attracted attention as electrolytes for lithium cells and the like because of the following advantages: (1) the energy density of a cell can be increased because the material can double as a separator, (2) leakage-free, high-reliability cells can be obtained by providing an all-solid construction, (3) it is easier to reduce the thickness or weight of a cell or to obtain an irregular shape, and the like.

There are two types of conventional solid polymer electrolytes: (1) polymers containing metal salts and (2) polymeric gels containing electrolyte solutions. With the first type, complexes of metal salts and polar polymers such as PEO (polyethylene oxide) form, and transport of lithium and other such ions accompanies the molecular motion of polymer chains. Such solid polymer electrolytes have high mechanical strength, but their ionic conductivity at room temperature has a limit on the order of $10^{-4}$ S/cm. It is therefore necessary to lower the molecular weight or to soften the polymers in order to intensify the molecular motion of the polymer chains, but this approach ultimately leads to a reduction in mechanical strength. With the second type, the contained electrolyte functions as an ionic conductor and preserves the polymers as solids. The ionic conductivity of such solid polymer electrolytes is on the order of $10^{-3}$ S/cm, that is, falls within a practicable range, but a disadvantage is that the polymers are plasticized by the electrolyte, and their mechanical strength is lowered.

Demand has existed for some time for solid polymer electrolytes whose ionic conductivity is on the order of $10^{-3}$ S/cm, whose thickness is on a par with that of conventional separators, and which have strength that does not present problems in terms of handling. Heat resistance is another consideration that has come into play in recent years as the performance of electrochemical reaction apparatuses has improved. In other words, a solid polymeric electrolyte composite for an electrochemical reaction apparatus should be able to preserve its diaphragm functions even when the apparatus heats up.

Composite solid polymeric electrolytes obtained by packing a solid polymer electrolyte into the pores of a polymeric porous film have been proposed as products satisfying both the ionic conductivity and mechanical strength requirements for solid polymer electrolytes (Japanese Laid-Open Patent Applications 1-158051, 2-230662, and 2-291607), but a satisfactory electrolyte has yet to be obtained.

Therefore, one object of the present invention is to provide a composite that utilizes a solid polymeric electrolyte for an electrochemical reaction apparatus that possesses satisfactory ion conduction properties and has excellent mechanical strength and heat resistance, and to provide an electrochemical reaction apparatus in which this electrolyte is used.

Ion exchange membranes are well known. Ion exchange membranes which utilize a microporous media have previously been disclosed (U.S. Pat. Nos. 5,547,551 and 5,599,614). Hitherto, the use of a microporous media was proposed primarily as a means of providing a "mechanical reinforcement function" only of the ion exchange media. This mechanical reinforcement provided improved dimensional stability as well as the capability to provide thinner overall membranes which in turn improved overall transport properties of the film (as measured through ionic conductance or moisture vapor transmission).

Also attempts to enhance ion exchange membrane properties have been attempted in the past by adding an additional component. U.S. Pat. No. 5,547,911 to Grot relates to a method to apply a layer of catalytically active particles to the surface of a membrane. U.S. Pat. No. 4,568,441 relates to the application of non-conductive inorganic particle to the surface of a membrane to improve gas release properties. Neither of these teaches that the dispersion of an additive within the membrane results in higher performance.

U.S. Pat. No. 5,322,602 to Razaq relates to improving the performance of an ion exchange polymer membrane by treating it with an acid which diffuses into the membrane.

WO 96/29752 to Grot et al relates to the incorporation of various inorganic fillers into a membrane to decrease fuel crossover. The ability to make thin very high conductance membranes is not addressed.

U.S. Pat. No. 5,523,181 (and Japanese patents 6-111827 and 6-111834) to Stonehart et al relates to an ion exchange membrane in which silica is dispersed throughout the membrane. No indication is made to a microporous substrate.

U.S. Pat. No. 5,472,799 to Watanabe relates to an ion exchange membrane which incorporates a catalyst layer. While a thin membrane is mentioned as desirable, no mention is made of a microporous support.

U.S. Pat. Nos. 5,547,551 and 5,599,614 relate to the use of a microporous support where the function is to improve strength and mechanical properties, allowing the use of thin high conductance membranes. The addition of fillers within the microporous support is not addressed; however, the use of additives with the ion exchange medium to enhance specific functional properties is disclosed. But it is difficult to distribute additive particles adequately since the microporous reinforcement also acts as a filtration medium impeding the flow of finely divided particulates.

There remains a need for thin high conductance membranes which have enhanced properties through the use of a functional support with the capability to provide multiple functions uniformly.

SUMMARY OF THE INVENTION

The shortcomings of the art are overcome by this invention which is:
    a composite membrane comprising:
        a) a microporous polymeric sheet having its pores extending from one side to the other,
        b) the structure defining the pores being at least partially covered with a functional material selected from:
            i) inorganic particulate;
            ii) metal; and
            iii) an organic polymer;
        c) the pores of the sheet being at least partially filled with polymer electrolyte selected from:

i) polymer compositions that contains metal salts;
ii) polymeric gels that contain electrolyte, and
iii) an ion exchange resin.

BRIEF DESCRIPTION OF THE DRAWINGS

The operation of the present invention should become apparent from the following description when considered in conjunction with the accompanying drawings, in which.

DETAILED DESCRIPTION OF THE INVENTION

Figure 1:
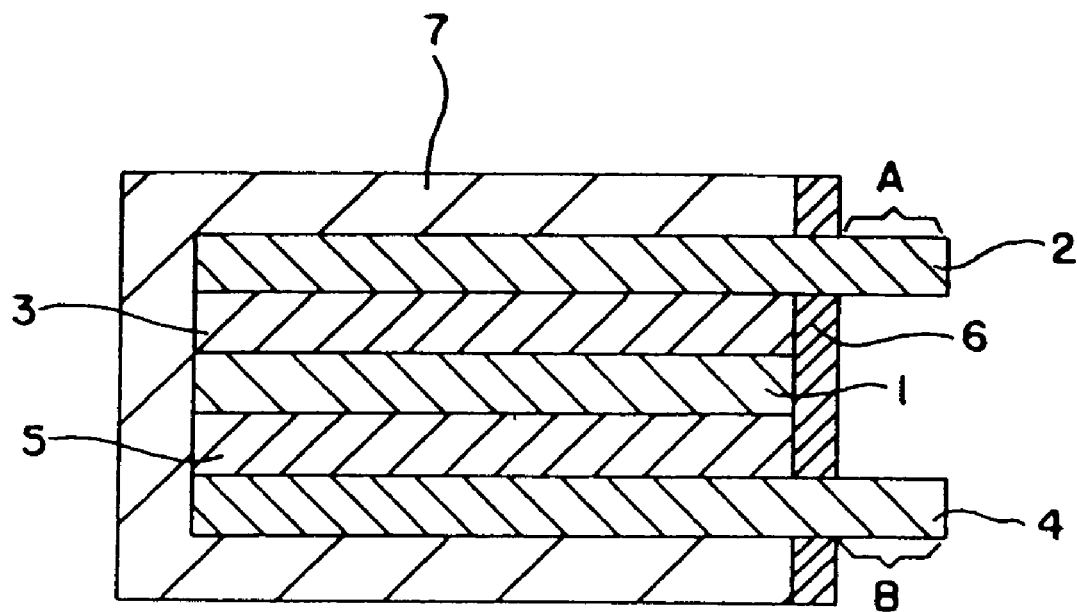
FIG. 1 depicts a structural cross-sectional diagram of a lithium secondary cell pertaining to the present invention.

An important feature of the invention is the functional material b). By "functional" is meant that the material has some feature which affects the properties and function of the composites.

The Microporous Sheet

Suitable microporous polymer films include those made from polyolefins, polyamides, polycarbonates, cellulosics, polyurethanes, polyesters, polyethers, polyacrylates, copolyether esters, copolyether amides, chitosan, and fluoropolymers. Suitable fluoropolymers include membranes of porous polytetrafluoroethylene, more preferably a membrane of expanded porous PTFE (sometimes referred to as ePTFE) produced by the process taught in U.S. Pat. No. 3,953,566 (to Gore).

Porous polytetrafluoroethylene sheet or film suitable for use in the invention can be made by processes known in the art, for example, by stretching or drawing processes, by papermaking processes, by processes in which filler materials are incorporated with the PTFE resin which are subsequently removed to leave a porous structure, or by powder sintering processes. Preferably the porous polytetrafluoroethylene film is porous expanded polytetrafluoroethylene film having a structure of interconnected nodes and fibrils, as described in U.S. Pat. Nos. 3,953,566 and 4,187,390 which describe the preferred material and processes for making them. The nodes and fibrils define an internal structure having a three-dimensional network of interconnected passages and pathways which extend vertically, from surface to surface, and laterally, from edge to edge, throughout the membrane. The porous polytetrafluoroethylene membrane should have a thickness in the range 3 to 1,000 micrometers, preferably in the range 5 to 100 micrometers; a pore volume in the range 20 to 98 percent, preferably in the range 50 to 90 percent; and a nominal pore size in the range 0.05 to 15 micrometers, preferably in the range 0.1 to 2 micrometers.

Microporous films of other polymers such as thermoplastic polymers are described in U.S. Pat. No. 4,539,256 to Sherman, incorporated herein by reference. Preparation of microporous polyurethanes is described in U.S. Pat. No. 4,429,000. Preparation of microporous polymeric films, especially microporous polyolefins (polyethylene, polypropylene, polybutenes, polypentenes, etc.) is described in British Patent 1339207. Preparation of microporous films by stretching is described in U.S. Pat. No. 4,726,989 where use of polyamides, polyolefins, polystyrenes, polyvinylidene fluoride, and polycaprolactanes are described. Preparation of microporous films by liquid extraction is described in U.K. Publication No. GB 2,026,381. Stretching is described in U.S. Pat. No. 4,100,238. Preparation by film fracture, hot stretching is described in U.S. Pat. No. 3,679,540. All these patents are incorporated by reference for their description of the polymers.

GB 2,026,381 discloses the preparation of membranes having a porous surface by blending polymer with a liquid component to form a binary two-phase system which, in the liquid aggregate state, has a region of miscibility and a region with miscibility gaps, forming a sheet of the blend, casting the film into a bath of the liquid component and removing the liquid component to provide porosity. The resultant non-oriented porous sheet has a relatively low tensile strength.

U.S. Pat. Nos. 3,953,566, 3,962,153, 4,096,227, 4,110,392, 4,187,390 and 4,194,041, all incorporated by reference, describe the preparations of porous articles, including microporous sheets, formed of polytetrafluoroethylene (PTFE), a non-thermoplastic polymer, which is characterized by having a microstructure of nodes connected by fibrils. Such articles are produced by extruding a paste comprised of PTFE particles and a lubricant, removing the lubricant and stretching and annealing the resultant product. The resultant product is a sintered, oriented porous film of PTFE.

U.S. Pat. Nos. 4,100,238 and 4,197,148, incorporated by reference, describe the preparation of microporous films by extruding a two component blend, solvent leaching one dispersed component and stretching the resultant leached film to obtain a desired porosity. The blend consists of polymer and a leachable, non-miscible substance. Once the leachable dispersed polymer phase is removed and the film oriented, a porous film results.

U.S. Pat. No. 3,679,540, incorporated by reference, discloses a method for making a microporous polymer film by cold stretching an elastic polymer film until porous surface regions are formed by film failure hot stretching the cold stretched film until fibrils and pores or open cells are formed and then heat setting the resultant film. Controlled porosity is generally not attained in such films because they do not always uniformly fibrillate to a specific pore size.

Certain U.S. patents disclose the preparation of porous polymer film by blending into the polymer non-miscible leachable particulate substance such as starch, salts, etc., forming a sheet and leaching the particulate substance from the polymer sheet. Such U.S. patents, incorporated by reference, include: U.S. Pat. Nos. 3,214,501 and 3,640,829, U.S. Pat. No. 3,870,593 discloses the preparation of a microporous polymer sheet by blending non-miscible, non-leachable filler into the polymer, forming a sheet of the blend and stretching the sheet to form pores which are initiated at the sites of the filler particles.

U.S. Pat. No. 4,539,256 which patent is hereby incorporated by reference, teaches a method of making a microporous sheet which comprises the steps of melt blending a crystallizable thermoplastic polymer with a compound which is miscible with the thermoplastic polymer at the polymer melting temperature but immiscible on cooling below the polymer melting temperature, forming a sheet of the melt blend, cooling the sheet to a temperature at which the compound becomes immiscible with the polymer to cause phase separation between the thermoplastic polymer and the compound to provide a sheet.

Such porous polymer films or sheets will preferably have a porosity of greater than 35%. More preferably, the porosity should be between 40-95% preferably 70%. The thickness of the film is preferably less than 2 mil (0.05 mm, 50 micrometers). Preferably the thickness is between 0.06 mils (1.5 micrometers) and 1.6 mils, and most preferably the thickness is between 0.50 mils (0.013 mm) and 1.50 mils (0.038 mm).

A preferred film is expanded porous PTFE commercially available in a variety of forms from W. L. Gore & Associates, Inc., under the trademark GORE-TEX membrane. The porous microstructure of such expanded porous PTFE films either comprises nodes interconnected by fibrils, or comprises substantially fibrils with substantially no nodes present. Preferred porous expanded PTFE films can be characterized as having a bubble point between 10 and 60 psi; and an air flow between 20 Frazier and 10 Gurley seconds. It may also have a pore size distribution value between 1.05 and 1.20; and a ball burst strength between 0.9 and 17 pounds/force.

The Functional Material

The material covering the structure defining the pores can be a metal oxide. The metal oxides endow the composite with improved mechanical strength sustainable over a long period of time ePTFE has good inherent mechanical strength, but this mechanical strength must be further enhanced by the metal oxide.

The metal oxide also acts as a matrix to stably retain the solid polymer electrolyte in the pores at a high content. Because of its high porosity, the ePTFE is capable of accepting and holding large amounts of solid polymer electrolytes. In addition, the solid polymer electrolyte that fills the pores cannot be desorbed easily because it is retained by the fine fibrils and minute nodes of ePTFE. Furthermore, the oxides, improve the wettability of the microporous sheet, making it easier for the solid polymer electrolyte to pack the pores.

In addition, the metal oxide is stable at elevated temperatures. The performance of lithium cells and other electrochemical reaction apparatuses is gradually improving, and it is believed that heating is caused by the repeated charging and discharging occurring at a high current density, by short circuits, and by other undesirable phenomena. If the solid polymer electrolyte lacks heat resistance or is incapable of preserving its shape at high temperatures, the functions are lost and an extensive short circuit occurs, creating the danger of a malfunction. A composite acts to prevent a short circuit from forming between electrodes.

In the present invention, an expanded porous polytetrafluoroethylene which has continuous pores and in which the inner surfaces of the pores are covered with a metal oxide is used in order to retain the aforementioned solid polymer electrolyte. Examples of the metal oxides used in this case include oxides of the following elements: lithium, beryllium, boron, sodium, magnesium, aluminum, Ai [sic], phosphorus, potassium, calcium, cerium, titanium, vanadium, chromium, manganese, iron, cobalt, nickel, copper, zinc, gallium, germanium, selenium, rubidium, strontium, yttrium, zirconium, niobium, molybdenum, ruthenium, rhodium, palladium, cadmium, indium, tin, antimony, tellurium, cesium, barium, lanthanum, cerium, praseodymium, neodymium, samarium, europium, cadmium, terbium, dysprosium, holmium, erbium, thulium, ytterbium, lutetium, thorium, protactinium, hafnium, tantalum, tungsten, platinum, titanium, lead, bismuth, and the like.

Functional additives can be, for example, an inorganic filler, or a catalyst or a combination of such materials. Examples include, but are not limited to, silica, platinum, titanium dioxide, platinum supported on silica, platinum supported on titania, carbon, boron nitride, barium titanate, or a blend of materials, or a polymer such as a fluorocarbon, or a polyolefin, etc.—different to the original microporous substrate and the ion exchange material utilized such as for example perflouro sulfonic acid resin.

One application is an improved self humidified membrane for a PEM fuel cell where the filler is silica or titanium dioxide which serves to aid in the back migration of product water from the cathode to the anode.

A second application is a self humidified low gas cross over PEM fuel cell membrane where the filler is platinum, or platinum supported on silica or titania, which serves to react and produce water in the membrane from any reactant which might otherwise diffuse through the membrane and degrade open circuit performance.

A third application is where the filler is boron nitride which serves to aid in heat conduction through the membrane.

A fourth application is a super capacitor where the filler is boron titanate which serves to increase the dielectric capability of the membrane.

A fifth application is where the filler is electrically conductive and serves to transport electrons through the membrane as well as protons for the production of $H_2O_2$ in a shorted fuel cell arrangement. This allows a much simpler cell design since it is no longer necessary to provide an external path for the electrons to flow.

A sixth application is where the filler is an ion exchange material which serves to improve the bond between the support and an ion exchange material in the polymer electrolyte.

A seventh application is where the filler is a material which lowers the surface energy of the substrate thus improving or allowing wetting and easier processing of ion exchange material into the microporous structure.

The Polymeric Electrolyte (1) Polymer Compositions that Contain Metal Salts.

Examples of polymer compositions include polyethers, polyesters, polyimides, cross-linked polyethers, polymers containing polyether segments, polymers of vinyl silane having alkoxy groups, polymethyl siloxanes having ethylene oxy (EO) groups, polyphosphazenes having EO groups, polymethacrylic acid esters having EO groups, polyacrylic acid, polyaziridine, polyethylene sulfide, and other polar polymer substances. Examples of electrolytes in the polymers include various metal salts such as $LiClO_4$, $LiCF_3SO_3$, LiF, NaI, LiI, NaSCN, $LiBF_4$, $LiPF_6$, $LiBPh_4$ (Ph: phenyl group), and other alkali metal salts, as well as sulfuric acid, phosphoric acid, trifluoromethanesulfonic acid, tetrafluoroethylenesulfonic acid, and other proton acids.

(2) Polymeric Gels that Include Electrolytes.

These polymers absorb and gel an electrolyte. Examples of such electrolyte solutions include solutions obtained by dissolving electrolytes and other necessary soluble polymers in organic solvents such as propylene carbonate, δ-butyrolactone, dimethoxyethane, dioxane, tetrahydrofuran, acetonitrile, dimethyl sulfoxide, methyl tetrahydrofuran, and sulfolane. The polymers are not subject to any particular limitations as long as they are polymers that have cross-linked structures and are capable of absorbing and gelling the aforementioned electrolyte solutions, and any of the various conventionally known products can be used.

(3) Ion-Exchange Resins

The ion-exchange polymeric materials used can be any ion-exchange materials that will provide the desired result. The materials are preferably fluorinated because the material should be substantially inert to chemical activity and should be heat resistant.

The ion-exchange polymeric material will of course contain ionic functionality, preferably sulfonic moieties, carboxylic moieties or phosphonic moieties. The functional groups are present in an amount sufficient to impart ion-exchange properties to the polymer. An equivalent weight too high results in the electrical resistivity being too high. But if the equivalent weight is too low, mechanical strength becomes poor. The ionic functionality will usually be provided by carboxylic, sulfonic or phosphonic groups present either on the polymer backbone or present on pendant groups that extend from the polymer backbone in a recurring fashion. The polymer backbone will preferably be a fluorinated hydrocarbon backbone chain. The functional group preferably will have the structure —COOM, —SO$_3$M or PO$_3$M$_2$, where M is hydrogen, a metallic cation or NH+4. If a metallic cation, it will preferably be an alkali metal or an alkaline earth metal, such as Na+, K+ or the like.

For carboxylic functionality, the pendant side chains which carry the above functional groups may have at the terminal end of the side chain a group of the formula:

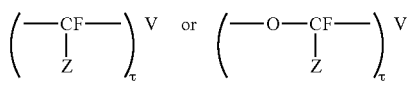

where V is —COOM, Z is —F or —CF$_3$ and τ is an integer of 1-12, preferably 1 or 2, as described in U.S. Pat. No. 4,437,951 to DuPont, all of which is incorporated by reference for its disclosure of both carboxylic and sulfonic functionality.

The sulfonyl polymers with which the present invention is concerned are typically polymers having a fluorinated hydrocarbon backbone chain to which are attached the sulfonic containing functional groups as pendant side chains. For sulfonic polymers, terminal portion of the side chains can be:
—CFRSO$_3$M,
—CF$_2$CFRSO$_3$M, or
—OCF$_2$CF$_2$—SO$_3$M, or the like
where R is F, Cl, or perfluoroalkyl and M is as described earlier.

For phosphoric polymers, the same sort of pendant groups are present.

Other ion-exchange resins useful herein, in addition to the fluorinated carboxylic resins and the fluorinated sulphonic and phosphoric resins described above, include, but are not limited to, polyvinyl alcohol (PVA), divinyl benzene/styrene copolymers, provided they have the requisite functional groups pendant chains. The polymers can be mixed with a metal salt to obtain the desired functionality. A sulfonated polymer of trifluorostyrene, such as homopolymer or a copolymer with tetrafluoroethylene, can be used.

It is understood that the foregoing description of ion-exchange resins is not limited and is representative. It is understood that the invention can employ any polymer type of ion-exchange material. Thus, as seen above, not only do the resins include ones with the functional group as a part of the polymer, but also ones where the functional groups are provided by an additive to the polymer.

The ion-exchange resins used in the invention can be prepared by general polymerization techniques developed for homo and copolymerizations of fluorinated ethylenes, particularly those employed for tetrafluoroethylene which are described in the literature. Nonaqueous techniques for preparing the copolymers include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0-200° C. and at pressures in the range of 105 to 2×10$^7$ Pascals (1-200 Atm.) or higher. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chloro-fluorocarbons such as 1,1,2-trichloro-1,2-2-trifluoroethane, and the like. Aqueous techniques for preparing such copolymers include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

In addition, ion-exchange polymer resins described and prepared as in U.S. Pat. No. 4,267,364 to DuPont; U.S. Pat. No. 4,544,458 to DuPont; U.S. Pat. No. 4,178,218 to Asahi; U.S. Pat. No. 4,255,523 to Asahi; U.S. Pat. No. 5,082,472 to Mallouk, et al.; and U.S. Pat. No. 5,422,411 to Wei, et al., all incorporated by reference, can be used.

Other examples of ion exchange materials include, such as polyvinyl alcohol, divinyl benzene, styrene based polymers, alpha beta triflurostyrene, or a ketone based ionomer such as sulfonated polyetherketone ether ketone (PEKEK) and metal salts with or without a polymer. The ion exchange material may also be comprised of at least in part a powder such as but not limited to carbon black, graphite, nickel, silica, titanium dioxide, platinum, boron nitrate, barium titanate or a non-ionic polymer such as poyvinylidene fluoride or a co-polymer of TFE, etc.

Preparation where Metal Oxide is the Functional Material.

An ePTFE in which the inner surfaces of the pores are covered with a metal oxide can be manufactured by a method comprising the following steps: a step in which the ePTFE is impregnated with a gelation product in the form of a solution obtained by allowing water to react with a hydrolyzable metal-containing organic compound, a step in which the gelation product in the form of a solution absorbed by the pores is allowed to react with water and converted to a gelation product in the form of a solid, and a step in which the gelation product in the form of a solid thus formed is heated and dried.

A metal alkoxide or metal complex is formed as the aforementioned hydrolyzable metal-containing organic compound (also referred to as the "metal oxide precursor").

Specific examples of metal alkoxides include tetramethoxytitanium, tetraethoxytitanium, tetraisopropoxytitanium, tetrabutoxytitanium, zirconium isopropylate, zirconium butyrate, tetramethoxysilane, tetraethoxysilane, tetraisopropoxysilane, and tetra-t-butoxysilane. Specific examples of metal complexes include titanium tetraacetyl acetonate, zirconium acetylacetonate, and other metal acetylacetonates. In the present invention, a silicone-based alkoxide such as tetraethoxysilane is particularly suitable for use.

The aforementioned metal oxide precursor is brought into contact with water, partially gelled, and made into a gelation product in the form of a solution before being complexed with the ePTFE. The gelation reaction can be a reaction well-known in the past, including a hydrolysis/polycondensation reaction.

Water can be added to the metal oxide precursor, and agitation and mixing can be performed, in order to partially gel the metal oxide precursor. A water-miscible organic solvent such as methanol, ethanol, propanol, butanol, or another alcohol can be added to the water in this case, and an acid (hydrochloric acid, sulfuric acid, nitric acid, acetic acid, hydrofluoric acid, or the like) or a base (sodium hydroxide, potassium hydroxide, ammonia, or the like) can also be added as needed. The partial gelation reaction of the metal oxide precursor can also be performed by adding water to the solution of the metal oxide precursor in an organic solvent, and agitating and mixing the system. In this case, any solvent can be used as the organic solvent as long as it is capable of dissolving the metal oxide. Aliphatic and aromatic hydrocarbons can be used in addition to alcohols. The gelation reaction is performed at a temperature that is generally 0 to 100° C. and preferably 60 to 80° C.

The proportion in which water is used should be 0.1 to 100 mol, and preferably 1 to 10 mol, per mole of the metal oxide precursor. Although it is preferable for the gelation reaction to be performed in a sealed system or in a flow of inert gas, it is also possible to promote the gelation reaction by the moisture contained in the outside air.

A partially gelled product in the form of a solution of the metal oxide precursor is thus obtained. As used herein, the term "partially gelled product of a metal oxide precursor" refers to a product used under conditions corresponding to the use of a metal oxide hydrous gel in the form of a solid that is a completely gelled product and that lacks fluidity.

To allow the partially gelled product of a metal oxide precursor to form a complex with the microporous sheet, it is possible to adopt a method in which the sheet is immersed in the partially gelled product in the form of a solution or a method in which the partially gelled product in the form of a solution is applied to the sheet with a spray or a roll, and any method can be used as long as it allows the partially gelled product to fill the pores of the surface portion and the interior of the sheet.

The sheet that has been complexed with the partially gelled product of a metal oxide precursor in such a manner is brought into contact with an excess amount of contained water in order to further promote the gelation reaction of the metal oxide precursor and to form a metal oxide hydrous gel in the form of a solid (completely gelled product). It is preferable for a method in which the sheet complexed with the partially gelled product of a metal oxide precursor is immersed in water to be used for such complete gelation, but it is also possible to use methods in which sprayed water is blown, steam is blown, or the like. In this case, the water used may contain acids or alkalis because it is used to promote the gelation reaction. A metal oxide hydrous gel is produced in the form of a film on the inner surfaces of the pores of the molding after the gelation reaction has been completed, and a monolithically deposited metal oxide forming a thin, uniform layer on the inner surfaces of the pores can be obtained by drying the gel at 300° C. or lower, and preferably 200° C. or lower. The thickness of the metal oxide layer is 0.01 to 0.2 µm, and preferably 0.02 to 0.1 µm. Because it is formed from a metal oxide hydrous gel obtained in such a manner, the metal oxide forms a monolithic, continuous film and has excellent adhesion that impairs its separation from the porous body. The metal oxide composite molding has a high void volume, which is at least 50%, and preferably at least 70%, of the void volume of the initial molding.

Alternatively, the functional material can be introduced into the micropores of the polymeric sheet by imbibing the material into the pores and then heating to remove the imbibing solvent. When the microporous polymeric sheet is polytetrafluoroethylene (PTFE), the functional material can be added by mixing a particulate filler with a PTFE aqueous dispersion; cocoagulating the filler and the PTFE; lubricating the filled PTFE with lubricant; paste extruding and optionally calendering to form a film; and expanding the film by stretching it so as to form a porous PTFE membrane having the filler distributed therein.

Alternatively, the microporous ePTFE can be plated with a metal described in U.S. Pat. No. 4,720,400 (Manniso).

Alternatively, a microporous article such as catalyst filled ePTFE described in part by U.S. Pat. No. 5,602,669 may be used as the substrate.

The solid polymer electrolyte can be placed into the pores by roll application, spraying, dipping, or another technique with a solution or dispersion containing the solid polymer electrolyte, and the solvent is then removed. The pores can be filled with a polymerization solution comprising an electrolyte and a monomer, and the ingredients polymerized inside the pores. The pores can be filled with a polymerization solution comprising an electrolyte, a monomer, and a solvent, the ingredients polymerized inside the pores, and the solvent is subsequently removed. The pores can be filled with an electrolyte-containing partially gelled solution of a polymer, and the ingredients are gelled inside the pores. Specific methods for introducing a solid polymer electrolyte into the pores of a molding are appropriately selected in accordance with the type of solid polymer electrolyte.

The pores can be either partially or fully imbibed with ion exchange medium such as an ionomer in an alcohol solution such as is commercially available from Ashai Glass such as Flemion® solution in ethanol. The ion exchange medium may subsequently be dried or re-dissolved as the case may require.

Figure 4:
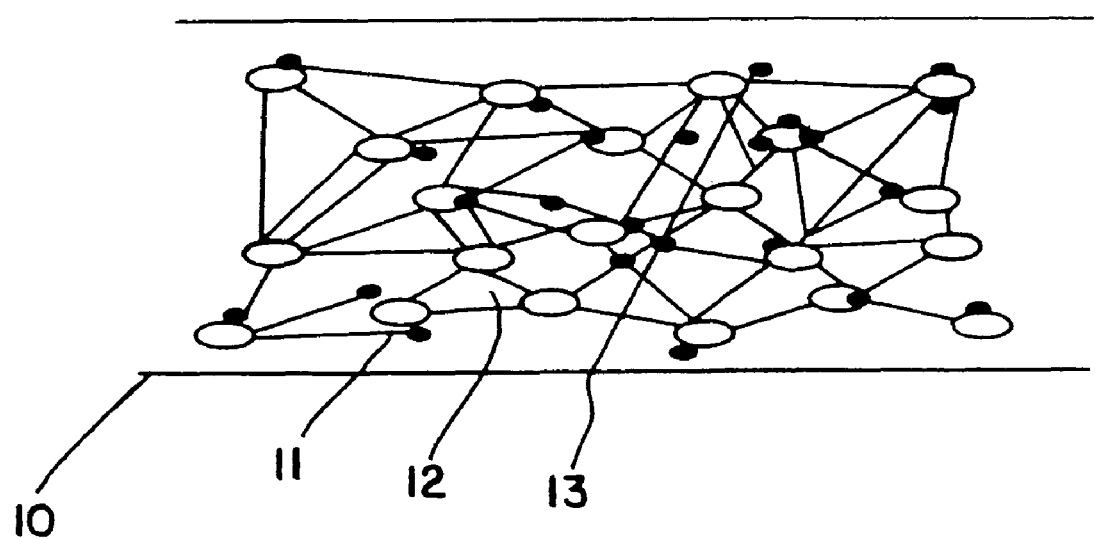
FIG. 4 depicts a porous microstructure having additives and polymer electrolyte.

A product of the invention is depicted in FIG. 4. A composite membrane 10 is provided which is made up of a microporous polymeric sheet comprised of nodes 11 and fibrils 12. In some embodiments, the sheet can be comprised of only fibrils. The nodes and fibrils are covered, at least in part by functional material 13. The space between the nodes and fibrils is then filled, preferably, completely (i.e., no air flow through) with the polymer electrolyte. Preferably the interior volume of the sheet is substantially occluded by the electrolyte.

The composite membranes of the present invention may be employed in various applications, including but not limited to polarity based chemical separations, electrolysis, fuel cells, batteries, pervaporation, gas separation, dialysis, industrial electrochemistry, super acid catalyst, medium for enzyme immobilization and the like.

Examples of use in some electrochemical applications include lithium primary cells, magnesium cells, and other primary cells, lithium secondary cells; polymer cells and other secondary cells; and fuel cells.

Example 1

100 parts of tetraethoxysilane (manufactured by Sinetsu Silicone), 52 parts of water, and 133 parts of ethanol were allowed to react for 24 hours at 80° C. under reflux conditions in which the supply of moisture contained in the outside air was shut off with the aid of a calcium chloride tube, yielding a partially gelated solution of a metal oxide precursor. An expanded porous polytetrafluoroethylene film (manufactured by Japan Gore-Tex Inc.; thickness: 25 µm; pore diameter: 0.5 µm; porosity: 92%) was impregnated with this solution and immersed in warm water (60° C.) for 5 hours to complete the gelation. The gelled product was dried for 30 minutes at 150° C., yielding a silica gel complex extended porous polytetrafluoroethylene film in which the exposed surfaces, including the inner surfaces, of the porous body were covered with the silica gel. This composite film retained at least 80% of the voids of the original porous film and was highly porous.

An acrylonitrile-methacrylate copolymer powder obtained from Japan Exlan Co. Ltd (molar ratio: 90/10) was subsequently added at a rate of 1.5 g/10 ml, and acetonitrile was added at the same time at a rate of 1.5 g/10 ml, to an organic electrolyte solution obtained by dissolving $LiPF_6$, an electrolyte liquid mixed with propylenecarbonate and ethyl carbonate obtained from Tomiyama Pure Chemical Industry, in a mixed solvent (organic solvent) of propylene carbonate and ethylene carbonate (volume ratio: 1/1) in such a way that the concentration was 1M, yielding an acetonitrile-diluted polymeric gel molecule/electrolyte mixture.

The acetonitrile-diluted polymer gel/electrolyte mixture was subsequently absorbed by the pores (cavities) of the aforementioned silica gel composite extended porous polytetrafluoroethylene film, then vacuum-dried for at least 5 hours at 60° C. to remove the acetonitrile, and finally cooled to −20° C., yielding a solid polymer electrolyte composite with a thickness of about 25 μm.

The ionic conductivity (20° C.; complex impedance technique) and the tensile strength as tested by JIS K 7113, of this polymer solid electrolyte composite were measured. The results are shown in Table 1.

Comparative Example 1

An acetonitrile-diluted polymeric gel/electrolyte mixture prepared in the same manner as in Example 1 was cast, yielding a solid polymer electrolyte (simple substance) with a thickness of 25 μm. In this case, the simple solid polymer electrolyte had insufficient mechanical strength, was difficult to handle, and was impractical as a film.

For the sake of comparison, a solid polymer electrolyte film (simple substance) composed of a polymer/electrolyte with a thickness of 100 μm was fabricated, and the ionic conductivity (20° C.; complex impedance technique) and tensile strength of the film were measured. The results are shown in Table 1.

It follows from Table 1 that the solid polymer electrolyte composite of the present invention is a solid polymer electrolyte in which the mechanical strength is significantly improved while the ionic conductivity is maintained at the level of a conventional solid polymer electrolyte. The composite of the present invention can be easily made into a thin film and stably fabricated into a solid polymer electrolyte film of about 25 μm, making it possible to reduce the resistance of the solid polymer electrolyte portion.

TABLE 1

| Item | Example 1 | Comparative Example |
|---|---|---|
| Ionic conductivity (S/cm$^2$) | $1.5 \times 10^{-3}$ | $1.5 \times 10^{-3}$ |
| Tensile strength (kg/cm$^2$) | 150 | 8 |

Example 2

A lithium secondary cell will now be described as an embodiment example of an electrochemical reaction apparatus obtained using the aforementioned solid polymer electrolyte composite.

Figure 2:
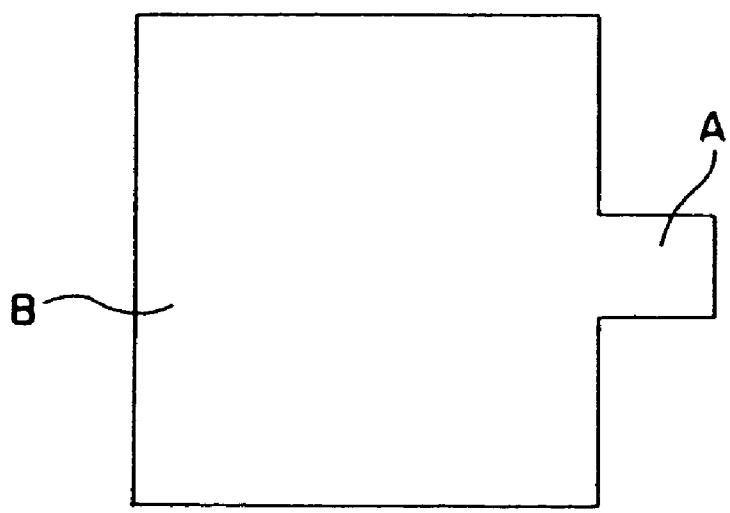
FIG. 2 depicts a plan view of a positive electrode terminal film doubling as a positive electrode collector made of aluminum.

FIG. 1 is a structural cross-sectional diagram of the lithium secondary cell of the present invention. In FIG. 1, 1 is the solid polymer electrolyte composite film pertaining to the present invention; 2 is a positive electrode terminal film doubling as a positive electrode collector made of aluminum; 3 is a positive electrode film consisting of $LiCoO_2$ (obtained from Nippon Chemical Ind.), acetylene black (obtained from Denki Kagaku as Denka Black), and a polymeric gel/electrolyte mixture (corresponds to a product obtained by removing acetonitrile from the aforementioned acetonitrile solution); 4 is a negative electrode terminal film doubling as a negative electrode collector made of copper; 5 is a negative electrode film consisting of graphite and a polymeric gel/electrolyte mixture (corresponds to a product obtained by removing acetonitrile from the aforementioned acetonitrile solution); 6 is a seal; and 7 is a casing. FIG. 2 is a plan view of the positive electrode terminal film doubling as a positive electrode collector made of aluminum. In FIG. 2, A is a positive electrode terminal, and B is a positive electrode collector.

Figure 3:
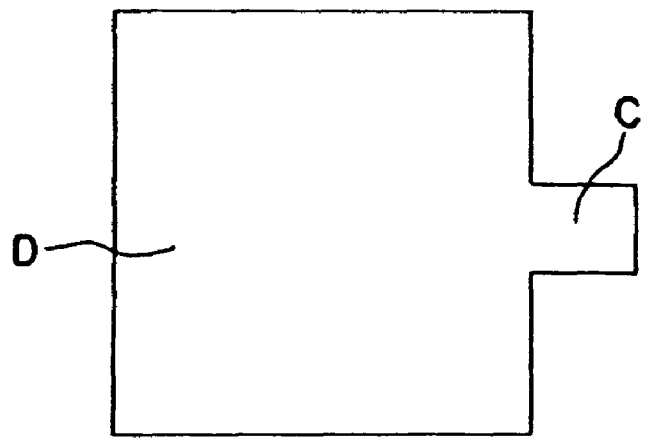
FIG. 3 depicts a plan view of a negative electrode terminal film doubling as a negative electrode collector made of copper.

FIG. 3 is a plan view of the negative electrode terminal film doubling as a negative electrode collector made of copper. In FIG. 3, C is a negative electrode terminal, and D is a negative electrode collector.

The method for manufacturing the aforementioned cell will now be described.

(1) Manufacture of Laminate L of Positive Electrode Film and Positive Electrode Terminal Film Doubling as Positive Electrode Collector Made of Aluminum 15 g of an acrylonitrile-methacrylate copolymer powder (molar ratio: 90/10) and 12 g of acetonitrile were simultaneously added to 100 ml of an organic electrolyte solution obtained by dissolving $LiPF_6$ in a mixed solvent (organic solvent) of propylene carbonate and ethylene carbonate (volume ratio: 1/1) in such a way that the concentration was 1M, yielding an acetonitrile-diluted polymer gel/electrolyte mixture.

4 g of an $LiCoO_2$ powder with a mean grain diameter of about 20 μm and 0.2 g of acetylene black were subsequently added to 7.3 g of the aforementioned acetonitrile-diluted polymer gel/electrolyte mixture, and the ingredients were uniformly agitated, yielding a starting solution for the positive electrode. This starting solution was spread over the entire surface (with the exception of the terminal A) of the flat aluminum positive electrode collector 2 (thickness: 20 μm) shown in FIG. 2, the collector was vacuum-dried for over 5 hours at 60° C. to remove the acetonitrile, and the dried collector was cooled to −20° C.

A laminate L of the positive electrode film 3 and the positive electrode terminal film 2 doubling as a positive electrode collector made of aluminum was thus obtained. In this laminate L, the terminal (A in FIG. 2) measured 1 cm×2 cm and had a thickness of 20 μm, and the positive electrode collector (B in FIG. 2) measured 5.8 cm×5.8 cm and had a thickness of 220 μm.

(2) Manufacture of Laminate M of Negative Electrode Film and Negative Electrode Terminal Film Doubling as Negative Electrode Collector Made of Copper 4 g of a partially graphitized carbon material (obtained from Kureha Chemical Co. Ltd) with a mean grain diameter of about 10 μm was added to 7.3 g of the aforementioned acetonitrile-diluted polymer gel/electrolyte mixture, and the ingredients were uniformly agitated, yielding a starting solution for the negative electrode. This starting solution was spread over the entire surface (with the exception of the terminal C) of the flat copper negative electrode collector 4 (thickness: 20 μm) shown in FIG. 3, the collector was vacuum-dried for over 5 hours at 60° C. to remove the acetonitrile, and the dried collector was cooled to −20° C.

A laminate M of the negative electrode film 5 and the negative electrode terminal film 4 doubling as a negative electrode collector made of copper was thus obtained. In this laminate M, the terminal (C in FIG. 3) measured 1 cm×2 cm and had a thickness of 20 μm, and the negative electrode collector (D in FIG. 3) measured 5.8 cm×5.8 cm and had a thickness of 520 μm.

(3) Manufacture of Solid Polymer Electrolyte Composite Film

A film 1 measuring 5.8 cm×5.8 cm was manufactured from the solid polymer electrolyte composite film (thickness: 25 μm) of Practical Example 1.

(4) Cell Manufacture

The aforementioned laminate L was superposed on one side of the solid polymer electrolyte composite film 1, the aforementioned laminate M was superposed on the other side, and the resulting assembly was kept at a pressure of 1 kg/cm2 for 1 minute, yielding a laminate.

The laminate was subsequently introduced into a casing (7 in FIG. 1) that consisted of polypropylene, was open at one end, and had a thickness of 1 mm. The open end was sealed with polypropylene resin film, yielding a seal (6 in FIG. 1).

The lithium secondary cell thus obtained was subjected to charge/discharge cycle tests at a temperature of 20° C., an upper limit of 4.3 V, and a lower limit of 3.0 V, with the discharge being conducted at a constant current of 8 mA. The results are shown in Table 2.

Comparative Example 2

A lithium secondary cell was manufactured using, as an electrolyte film, the solid polymer electrolyte (simple substance; thickness: 25 μm) of Comparative Example 1 instead of the solid polymer electrolyte composite film in Practical Example 2, but the components were difficult to handle and could not be made into a cell.

In view of this, a lithium secondary cell was fabricated in the same manner as in Practical Example 2 except that the solid polymer electrolyte film (simple substance; thickness: 100 μm) of Comparative Example 1 was used instead of the solid polymer electrolyte composite film.

The resulting cell was subjected to charge/discharge cycle tests at a temperature of 20° C., an upper limit of 4.3 V, and a lower limit of 3.0 V, with the discharge being conducted at a constant current of 8 mA. The results are shown in Table 2.

It can be seen in Table 2 that the lithium secondary cell of the present invention remains stable over a large number of cycles and that the cell capacity deteriorates only slightly even when the number of cycles exceeds 200.

By contrast, the lithium secondary cell of Comparative Example 2 is configured in such a way that the solid polymer electrolyte portion (simple substance) of the cell is four times thicker than the corresponding portion of the cell obtained in Practical Example 2, quadrupling the resistance of the solid polymer electrolyte portion (simple substance). As a result, the capacity deteriorates only slightly even when the number of cycles exceeds 200, but the discharge capacity is low. These results indicate that the present invention allows a compact, high-performance cell to be obtained.

TABLE 2

| Number of charge/discharge cycles | Discharge capacity (mAh) | |
|---|---|---|
| | Product of present invention | Comparison product |
| 1 | 46.5 | 40.0 |
| 50 | 56.3 | 43.2 |
| 100 | 56.2 | 43.1 |
| 150 | 56.2 | 42.9 |
| 200 | 56.1 | 42.8 |
| 250 | 56.0 | 42.7 |

Example 3

A multi-functional membrane was made by
a) mixing a particulate filler with PTFE aqueous dispersion,
b) cocoagulating the filler and the PTFE
c) lubricating the filled PTFE with lubricant
d) paste extruding and optionally calendering to form a film
e) expanding said film by stretching it so as to form a porous PTFE having said filler distributed therein.

An aqueous dispersion of PTFE resin (20-36% solids) was obtained. Into the aqueous dispersion, particulate filler of Fumed Silica, Cabosil® M5, from Cabot Corp. was added to produce a 20% by weight silica final dried mixture. This mixture was cocoagulated by rapid shearing of the aqueous dispersion. A coagulum of fine powder PTFE resin and silica filler was subsequently formed and dried into cakes. When dry, the cakes were carefully crumbled and lubricated with an odorless mineral spirit. The amount of mineral spirits used was 0.52 grams per gram of PTFE/$SiO_2$ dry powder.

This mixture was aged below room temperature to allow for the mineral spirits to become uniformly distributed within the PTFE/$SiO_2$ powder resin. This mixture was compressed into a billet and extruded at 1200 psi through a 0.045 inch by 6 inch gap die attached to a ram type extruder to form a coherent extrudate. A reduction ratio of 44:1 was used.

Two layers of extrudate were stacked together to form 100 mil assembly and subsequently rolled down between two metal rolls which were heated to between 50° C. The final thickness after roll down was 0.014 inch. The material was transversely expanded at a ratio of 3:1 and then the mineral spirits were removed from the extrudate by heating the mass to 250° C. (i.e. a temperature where the mineral spirits were highly volatile). The dried extrudate was transversely expanded at 150° C. at a ratio of 3.5:1 and a rate of 2300% per second. After expansion the sheet was amorphously locked at greater than 340° C. and cooled to room temperature.

This membrane was subsequently imbibed with ion exchange resin solution as in example 5 to create a ion exchange composite membrane.

Electrodes loaded at 0.3 mg/$cm^2$ platinum were attached to both sides of the membrane and the membrane electrode assembly was placed in a single cell fuel cell test apparatus.

Air and $H_2$, both at 40 psig and 25° C., were fed to the cell. A steady state current of 1.178 amps/$cm^2$ was produced at 0.5 volts with no humidification of the incoming reactants. Cell temperature was 50° C. A microreinforced membrane with no filler yielded only 0.975 amps at the same test conditions.

Example 4

An aqueous dispersion of PTFE resin was obtained. Into the aqueous dispersion, a particulate carbon black (Ketjen Black) filler was added to produce a 20% by weight final dried mixture. This mixture was cocoagulated by rapid shearing of the aqueous dispersion. A coagulum of fine powder PTFE resin and carbon filler was subsequently formed and dried into cakes. When dry, the cakes were carefully crumbled and lubricated with an odorless mineral spirit. The amount of mineral spirits used was 0.20 grams per gram of PTFE/carbon black dry powder.

This mixture was compressed into a billet and extruded at 1500 psi through a 0.045 inch by 6 inch gap die attached to a ram type extruder to form a coherent extrudate. A reduction ratio of 84:1 was used.

The extrudate was then rolled down between two metal rolls which were heated to between 50° C. The final thickness after roll down was 0.010 inch. The mineral spirits were removed from the extrudate by heating the mass to 250° C. (i.e. a temperature where the mineral spirits were highly volatile). The dried extrudate was transversely expanded at 150° C. at a ratio of 3.5:1. After expansion, the sheet was heated to amorphously locked at greater than 340° C. and cooled to room temperature.

This membrane was subsequently imbibed with Flemion® (Asahi Glass) ion exchange resin solution (9% by weight resin in ethanol) and dried 3 times.

The final composite thickness was 27 microns.

Example 5

An aqueous dispersion of PTFE resin is obtained. Into the aqueous dispersion, a particulate titania filler was added to produce a 20% by weight final dried mixture. This mixture was cocoagulated by rapid shearing of the aqueous dispersion. A coagulum of fine powder PTFE resin and titania filler was subsequently formed and dried into cakes. When dry, the cakes were carefully crumbled and lubricated with an odorless mineral spirit. The amount of mineral spirits used was 0.20 grams per gram of PTFE/titania dry powder.

This mixture was compressed into a billet and extruded at 1500 psi through a 0.045 inch by 6 inch gap die attached to a ram type extruder to form a coherent extrudate. A reduction ratio of 84:1 was used.

The extrudate was then rolled down between two metal rolls which were heated to between 50° C. The final thickness after roll down was 0.008 inch. The mineral spirits were removed from the extrudate by heating the mass to 250° C. (i.e. a temperature where the mineral spirits were highly volatile). The dried extrudate was transversely expanded at 150° C. at a ratio of 3.5:1 and at a rate of 440% per second. After expansion, the sheet was amorphously locked at greater than 340° C. and cooled to room temperature.

It was subsequently imbibed with ion exchange media by brushing both sides with a solution of PFSA in ethanol (Flemion® 9% by weight).

Example 6

An aqueous dispersion of PTFE resin was obtained. Into the aqueous dispersion, a platinum coated titania catalyst was added to produce a 10% by weight final dried mixture. This mixture was cocoagulated by rapid shearing of the aqueous dispersion. A coagulum of fine powder PTFE resin and catalyst filler was subsequently formed and dried into cakes. When dry, the cakes were carefully crumbled and lubricated with an odorless mineral spirit. The amount of mineral spirits used was 0.26 grams per gram of PTFE/catalyst dry powder.

This mixture was compressed into a billet and extruded at 3000 psi through a 0.045 inch by 6 inch gap die attached to a ram type extruder to form a coherent extrudate. A reduction ratio of 44:1 was used.

The extrudate was then rolled down between two metal rolls which were heated to 50° C. The final thickness after roll down was 0.016 inch. The mineral spirits were removed from the extrudate by heating the mass to 250° C. (i.e. a temperature where the mineral spirits were highly volatile).

A portion of this roll was then placed within a batch film expansion machine and expanded at an expansion rate of 500% per second to a ratio of 12:1 in both the machine and transverse direction.

This microporous membrane was subsequently imbibed with a fluorinated sulfonic acid resin composition as in example 5. The final thickness of the composite membrane was 15 microns. Electrodes with a total of 0.6 mg Pt/cm$^2$ were attached and the membrane tested in a single cell fuel cell test apparatus. Air and $H_2$, both at 40 PSIG and 25° C., were fed to the cell. A steady state current of 0.47 amps/cm$^2$ was produced at 0.8 volts with no humidification of the incoming gasses. Cell temperature was 50° C. A 15 micron microreinforced membrane with no filler yielded only 0.36 amps at 0.8 volts under the same conditions.

| Current | Voltage for Example 5 | Coltage for Example 7 |
| --- | --- | --- |
| 300 mA/cm$^2$ | 0.835 | 0.810 |
| 600 mA/cm$^2$ | 0.775 | 0.750 |
| 900 mA/cm$^2$ | 0.705 | 0.670 |

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An integral, substantially air impermeable polymeric membrane for use in an electrochemical apparatus or process comprising:
   a) a polymeric sheet comprising polymer and having a porous structure with a microstructure of nodes and fibrils and an interior volume of said porous structure between the nodes and fibrils,
   b) the polymeric sheet having distributed in the nodes and fibrils of the polymeric sheet:
      i) metal;
      ii) an organic polymer; or
      iii) a combination thereof, and
   c) said interior volume of said porous structure comprising a porosity of the polymeric sheet of greater than 35% and being substantially occluded by an ion-exchange resin to provide ionic conductance for use in the electrochemical apparatus or process.

2. The membrane of claim 1 wherein the polymeric sheet has distributed therein a precious metal.

3. An integral, substantially air impermeable polymeric membrane for use in an electrochemical apparatus or process comprising:
   a) a polymeric sheet comprising polymer and having a porous structure with a microstructure of nodes and fibrils and an interior volume of the porous structure between the nodes and fibrils,
   b) fumed silica distributed in the nodes and fibrils of the polymeric sheet, and
   c) electrolyte substantially occluding said interior volume of said porous structure to provide ionic conductance for use in the electrochemical apparatus or process.

4. The membrane of claim 1 wherein the polymeric sheet has distributed therein titania.

5. The membrane of claim 1 wherein the polymeric sheet has distributed therein platinum.

6. The membrane of claim 1 wherein the polymeric sheet has distributed therein platinum supported on a substrate.

7. A polymeric membrane for use in an electrochemical apparatus or process comprising:
   a) a polymeric sheet comprising polymer and having a porous structure with a microstructure of nodes and fibrils and an interior volume between the nodes and fibrils,
   b) the polymeric sheet having distributed in the nodes and fibrils:
      i) metal;
      ii) an organic polymer; or
      iii) a combination thereof, and
   c) said interior volume of said porous structure is substantially occluded by an ion-exchange resin to provide ionic conductance for use in the electrochemical apparatus or process,
   wherein the polymeric sheet is expanded porous PTFE.

8. The membrane of claim 1, wherein the polymeric sheet has metal distributed therein.

9. The membrane of claim 1, wherein the polymeric sheet has an organic polymer distributed therein.

10. The membrane of claim 1, wherein the polymeric sheet has a thickness of less than 50 microns.

11. The membrane of claim 1, wherein the membrane is disposed between two fuel cell electrodes.

12. The membrane of claim 11, wherein the polymeric sheet has a thickness of less than 38 microns, and wherein the membrane that is disposed between said two electrodes of a fuel cell provides a steady state current of at least 1.78 amps/$cm^2$ at 0.5 volts, with no humidification of incoming fuel cell air and hydrogen reactants, with air and hydrogen feed both at 40 psig and 25° C., and the fuel cell temperature at 50° C.

13. The membrane of claim 1, wherein said ion-exchange resin is fluorinated.

14. The membrane of claim 10, wherein the polymeric sheet has a thickness between 13 microns and 50 microns.

15. The polymeric membrane of claim 1 in which the polymeric sheet comprises a porous polymeric film; and the ion exchange resin is a polymer different from the polymeric film.

16. The polymeric membrane of claim 1 in which said interior volume of said porous structure comprises a porosity of the polymeric sheet comprises a porosity of the polymeric sheet of 40% to 95%.

17. The polymeric membrane of claim 1 in which said interior volume of said porous structure comprises a porosity of the polymeric sheet comprises a porosity of 70% to 95%.

18. The polymeric membrane of claim 1 in which the polymeric sheet comprises an expanded porous PTFE film having substantially fibrils with substantially no nodes present.

* * * * *